US007010686B2

(12) United States Patent
Thoone et al.

(10) Patent No.: US 7,010,686 B2
(45) Date of Patent: Mar. 7, 2006

(54) METHOD FOR ENABLING A FILE

(75) Inventors: Martin Thoone, Asslar (DE); Theo Drijfhout, Braunfels (DE)

(73) Assignee: Mannesmann VDO AG, Frankfurt am Main (DE)

( * ) Notice: Subject to any disclaimer, the term of this patent is extended or adjusted under 35 U.S.C. 154(b) by 1047 days.

(21) Appl. No.: 09/823,875

(22) Filed: Mar. 30, 2001

(65) Prior Publication Data

US 2001/0047341 A1    Nov. 29, 2001

(30) Foreign Application Priority Data

Mar. 30, 2000   (EP)   ................................. 00106809

(51) Int. Cl.
*H04L 9/00*   (2006.01)
*G06F 17/00*   (2006.01)
*G06F 12/00*   (2006.01)
*G06F 12/08*   (2006.01)
*G06F 12/14*   (2006.01)

(52) U.S. Cl. ...................... 713/165; 713/155; 713/171; 713/184; 713/193; 713/200; 707/9; 705/52; 711/163

(58) Field of Classification Search ................ 713/165, 713/155, 171, 184, 200; 707/9; 705/52; 711/163
See application file for complete search history.

(56) References Cited

U.S. PATENT DOCUMENTS

| 5,677,953 A | | 10/1997 | Dolphin |
| 5,809,145 A | * | 9/1998 | Slik et al. ...................... 705/52 |
| 5,883,954 A | * | 3/1999 | Ronning ...................... 705/52 |
| 6,041,411 A | | 3/2000 | Wyatt |

FOREIGN PATENT DOCUMENTS

WO    WO 98/42098    9/1998

* cited by examiner

*Primary Examiner*—David Y. Jung
*Assistant Examiner*—John Elmore

(57) ABSTRACT

A method for enabling use rights on a file, which is stored on a storage medium together with at least one other file and is provided with an identifier, for use by a single computer system or by a limited number of local computer systems, wherein a central station calculates a first and second scrambled code PIN and ACW containing a key k, for decrypting the files stored in encrypted form, and a device identification number ID. The device identification number ID is changed with each new enabling operation. Once the two scrambled codes have been entered into the computer system, the computer system first calculates a new device identification number ID from stored data and uses this new device identification number ID and the first scrambled code PIN for the key k and uses the key k and the second scrambled code ACW to calculate an identifier AC for the file which is to be enabled.

27 Claims, 5 Drawing Sheets

Fig. 3 a) Nr: 01 02 03 04 05 06 07 08 09 10
   AC:  1  1  0  0  0  1  0  0  0  0 b) Nr: 01 r 02 r 03 r 04 r 05 r 06 r 07 r 08 r 09 r 10
   AC:  1 1 1 0 0 1 0 0 0 1 1 0 0 0 0 1 0 0 0 c) Nr: 01 02 03 04 05 06 07 08 09 10 t1 t2 t3
   AC:  1  1  0  0  0  1  0  0  0  0  0  1  0

METHOD FOR ENABLING A FILE

BACKGROUND OF THE INVENTION

1. Field of the Invention

The present invention relates to a method for enabling a file, which is stored on a storage medium together with at least one other file, for use by a single computer system or by a limited number of local computer systems. The invention also relates to a system for managing and enabling use rights on files.

2. Description of the Related Art

Computer programs and databases are usually sold to the end user on a storage medium, such as a CD-ROM. Such a storage medium has a high storage capacity and can usually hold a number of computer programs, possibly in compressed form. Such a CD-ROM can therefore have a high selling value. Using suitable devices ("CD burners"), it is a relatively simple matter to make copies of CD-ROMs. Copied CD-ROMs are sometimes swapped free of charge among interested parties or are sold illegally. There is therefore a need to enable appropriate programs or, more generally, files only for registered users.

Since a single CD-ROM can hold a number of programs or files, it is also important to enable only individual programs or a particular number of programs for a particular user. By way of example, a CD-ROM can hold the usual standard office software. Office software includes, by way of example, a word-processing program, a spreadsheet, a database program and a program for creating presentations. However, the individual user is sometimes interested only in some of the programs, such as the word-processing program and the spreadsheet, while the other components are not important to him. The case may also arise in which a user is interested only in the updated version of one of these programs, but otherwise the older versions of the rest of the programs are entirely adequate for him, because he uses them only rarely, for example. Nevertheless, in both cases, the user occasionally has to purchase the entire package because the individual programs are not available separately. This is because selling the programs individually requires greater effort from the manufacturer, and is therefore frequently not done. For the cases mentioned, it is therefore useful to enable only individual programs or files on a CD-ROM for use by a particular user. Ideally, such enabling should again be associated with an appropriate level of copy protection, so that, once the file has been enabled, it can also be used only by the registered and authorized user.

EP 0 679 979 A1 discloses a method which is used to allocate temporary use rights on a piece of computer software. To this end, the encrypted software is first stored on a storage medium together with a file management program. The storage medium is then sent to the potential user. The user then loads the file management program into his computer system. The program stored on the storage medium is then accessible for this computer system. The file management program loaded into the computer restricts access to the program. Although the method described can be used to ensure restricted access to a computer program, there is no provision for just individual files or programs to be enabled specifically.

It is therefore one object of the present invention to specify a method which, first, ensures that a computer program or a file is used only by an authorized user, and, second, allows just individual programs or files on a storage medium to be enabled for a particular user.

It is another object of the present invention to specify a system for managing and enabling use rights on files which can be used to carry out such a method. Other objects and advantages of the present invention will be apparent in light of the following Summary and Detailed Description of the presently preferred embodiments.

SUMMARY OF THE INVENTION

In one embodiment of the present invention, access to a computer program is limited by a method for enabling a file which is stored on a storage medium together with at least one other file and is provided with an identifier AC, for use by a single computer system or by a limited number of local computer systems by:

- transmitting a device identification number ID(i-1) for the computer system, which is stored in the computer system, to a central station,
- calculating a new device identification number ID(i) using the transmitted device identification number ID(i-1) and an alternating code c in the central station,
- stipulating a first scrambled code PIN using the calculated device identification number ID(i) and a key k in the central station,
- stipulating a second scrambled code ACW using the identifier for the file which is to be enabled and the key k in the central station,
- transmitting the first scrambled code PIN and the second scrambled code ACW from the central station to the local computer system,
- calculating the new device identification number ID(i) in the local computer system from the previously stored device identification number ID(i-1) and the alternating code c, which is stored in a nonvolatile memory of the local computer system,
- calculating the key k using the first scrambled code PIN and the device identification number ID(i),
- calculating the identifier AC for the file using the second scrambled code ACW and the key k,
- enabling the file provided with the identifier AC for use by the local computer system.

The method according to the invention ensures that a file is used exclusively by an authorized user. This is accomplished by virtue of the fact that the file which the user originally receives is encrypted. Hence, although the storage medium, for example a CD-ROM, on which the files are stored and distributed can still be copied, the files can initially be used only if the appropriate key for decrypting the files is known. To prevent the appropriate key from also being passed on to an unauthorized user by an authorized user, the invention provides that the key, for its part, is also transmitted only in scrambled form to the authorized user. The scrambled code containing the key also contains the device identification number for the authorized computer. This ensures that, if the scrambled code containing the key is passed on, this code cannot be used on another computer having a different device identification number.

Another alternate exemplary embodiment of the present invention provides that, having been enabled once, the file can be used on a limited number of computers. This can be achieved by virtue of these computers having the same device identifier, or by using only parts of the device identifier which are the same for these computers.

To enable only particular files for use, a second code is provided, which contains details about the file which is to be enabled. This second code also first needs to be unscrambled in the computer system initially, and this is likewise possible only with the correct device identification number for the computer system. Unscrambling the code on an unauthorized computer system results, on account of the latter's different device identification number, in a different unscrambling result, and hence in an incorrect identifier for the file which is to be enabled. To increase the protection of the method further, the invention also provides in a further exemplary embodiment that the device identification number is changed by the central station whenever a file is enabled.

The files are stored on the storage medium preferably in a logical file structure, in particular in a hierarchical file structure. The identifier for a particular file can then easily be indicated using the file structure. In particular, the invention provides that the identifier for a file can be described as a vector. Such a vector makes it a particularly simple matter to show the position in a hierarchical file structure. This can be done, for example, by virtue of the components of the vector showing the path to the file which is to be enabled in the file structure. It is particularly advantageous in this context if the vector takes binary components, that is to say components which have only two states. The components of the vector can then characterize the path within the hierarchical file structure, with, by way of example, the value 1 enabling a path while the value 0 blocks a path. This can, in particular, also be achieved by virtue of the vector having at least m components, where m is the number of files. In this context, files are also understood as meaning file directories, which may themselves in turn contain file directories and/or files.

If a CD-ROM thus has a file structure containing m files (including the file directories), then, in particular, each vector for a file has m components, which are denoted by $a(1)$, $a(2)$, $a(3)$, $a(m)$, for example. In this case, each of these components $a(x)$ denotes a file or file directory. If the path for a particular file $D(x)$ in the hierarchical file structure is routed, by way of example, via the file directories $a(2)$, $a(5)$, $a(9)$, then the components $a(2)$, $a(5)$, $a(9)$ and $a(x)$ are characterized by the value 1, while all other components of the vector take the value 0. Such a vector is allocated to a particular file by the file management program stored in the computer. The vector AC for the identifier for the file which is to be enabled is transmitted to the authorized user in scrambled form, as already mentioned. In this case, the scrambled code may, in particular, also contain other information, such as information relating to a time limit on the use right. This is possible, in particular, by virtue of the scrambled code likewise being transmitted as a vector or being converted into a vector by the computer system, in which case the vector then contains one or more components with information relating to the time limit on the use right. This also means that it is a simple matter for, initially, just use rights for test purposes to be obtained at a low price or free of charge for a limited period of use, and only then for a decision to be made as to whether the software use rights with no time restriction will be obtained.

Since the identifier for the file which is to be enabled is preferably processed as a vector, it is particularly advantageous if the key k used to encrypt the files and the device identifier ID are also processed as a vector. The encryption can be performed on the basis of one of the known methods, in particular on the basis of the Data Encryption Standard (DES) using a key with a length of 56 bits.

The method according to the invention can be used generally for enabling and managing use rights on files, but it can be used advantageously in particular when only a particular type of computer programs and files is used on the computer systems, since management by a single central station is then easier to implement. The method can therefore be used particularly advantageously, by way of example, for enabling use rights on programs and files for navigation computers in motor vehicles. Such navigation systems use not only road map data and travel guides but also other application programs, such as for assigning numbers of highway junctions to geographical data and the like. The high storage density of CD-ROMs and, in particular, of the more recent DVDs means that an individual storage medium can hold, by way of example, all the road maps for the countries in Europe, and the appropriate travel guides for these countries. First, this type of data medium represents a comparatively high value, and secondly, not every user requires all the data. By way of example, it may be that a user requires only the road map data for his native country, because he never takes his own motor vehicle abroad. On the other hand, another user in turn regularly travels not only in his native country but also through the adjoining countries in his own car, which means that he also needs the road map data for these countries and the travel guides and/or hotel databases or the like.

The method according to the invention can thus be used to enable the files for a wide variety of desired uses, so that each user firstly purchases only the use rights for the regions which are initially important to him. Thus, if a user has obtained, together with the navigation system, only the use rights on the map data for his native country, for example, then, when these use rights are purchased, the device identification number for the appropriate navigation system, and preferably also the information relating to the use rights already purchased, are stored in the central station. The navigation system itself likewise stores the device identification number, and an alternating code c. If the user now wants to extend his use rights to the road map data for another country, then he contacts the central station, conveying to it his identification data and also his request and the manner of payment, for example his credit card number. The central station, which knows the device identification number $ID(i)$ for this user, first uses the alternating code c, which is likewise stored in the central station, to calculate a new device identification number $ID(i)$. A first scrambled code PIN is then stipulated in the central station using the calculated device identification number $ID(i)$ and the key k for decrypting the file. A second scrambled code ACW is then stipulated in the central station using the identifier for the file which is to be enabled and the key k. The scrambled codes are numerical codes which, in particular, may also be transmitted to the user in decimal form. In the latter case, when the decimal codes have been transmitted to the user and when the codes have been entered into the navigation system, the decimal codes are first converted into binary codes, the individual places in the binary code being the components of a vector. The navigation system first calculates the new device identification number $ID(i)$ from the previously stored device identification number $ID(i-1)$ and the alternating code c stored in a nonvolatile memory of the local computer system. The key k is then calculated in a further calculation step using the first scrambled code PIN and the newly calculated device identification number $ID(i)$. In a further step, the key k and the second scrambled code ACW are used to calculate the identifier AC for the file which is to be enabled. The file management system then enables the file with the identifier AC for use by the navigation system.

A system according to the invention for managing and enabling use rights on files which is suitable for carrying out the method according to the invention contains the following components:

a multiplicity of local computer systems, where each of the computer systems can be identified by a device identification number ID stored in the computer system, storage media for the local computer systems, on which at least two files are stored and provided with an identifier AC, a central station having a central computer system in which the device identification numbers ID for the local computer systems are recorded, where the central station contains means for stipulating a first and a second scrambled code (PIN and ACW) for the purpose of enabling use rights on a file for one of the local computer systems, at least one of the codes containing the stored device identification number for the local computer system, and at least one of the codes containing the identifier AC for the file which is to be enabled, means for transmitting the scrambled codes to the local computer system, means for unscrambling the transmitted codes in the local computer system using the device identification number stored in the local computer system, and for enabling the file for use by the local computer system.

To be able to accommodate a plurality of files on a single storage medium, this storage medium needs to have a sufficiently high storage capacity. In particular, a CD-ROM or a DVD is regarded as being a particularly advantageous storage medium. Alternatively, the files may be stored on the hard disk of the local computer in encrypted form. In this case, the files may have been transmitted over the Internet, for example.

In one particular embodiment, the first and the second scrambled code can be transmitted directly from the central station to the local computer system. Such transmission may take place both on a wired basis and wirelessly, the existing communication network, that is to say a telephone landline network or a mobile radio network, preferably being used in both cases. The user can then select the desired file directly in his computer system and can convey this selection, together with the required payment data, to the central station over the telephone network or over the Internet. The scrambled codes are then also transmitted by the central station directly to the computer system over the telephone network or the Internet. This allows use rights to be enabled very quickly and in automated fashion. The use rights are thus enabled by means of the inherently known systems for electronic commerce. Alternatively, the enable request and the scrambled codes may be transmitted conventionally by means of a telephone call or by sending them by post.

In one particular embodiment, the codes are stored on an inexpensive low-density storage medium, such as an IC card, which means that simply inserting the IC card into an appropriate reader of the computer system enters the codes into the computer system, and there is no need for manual input.

In another particular embodiment, which is of particular importance for motor vehicle applications and hence for navigation systems, the codes may also be entered by means of voice input.

The invention is explained in more detail below with the aid of an illustrative embodiment and the drawing, in which:

BRIEF DESCRIPTION OF THE DRAWINGS

FIG. 3 illustrates different variants of the identifier for the file which is to be enabled.

DETAILED DESCRIPTION OF THE PRESENTLY PREFERRED EMBODIMENTS

Figure 1:
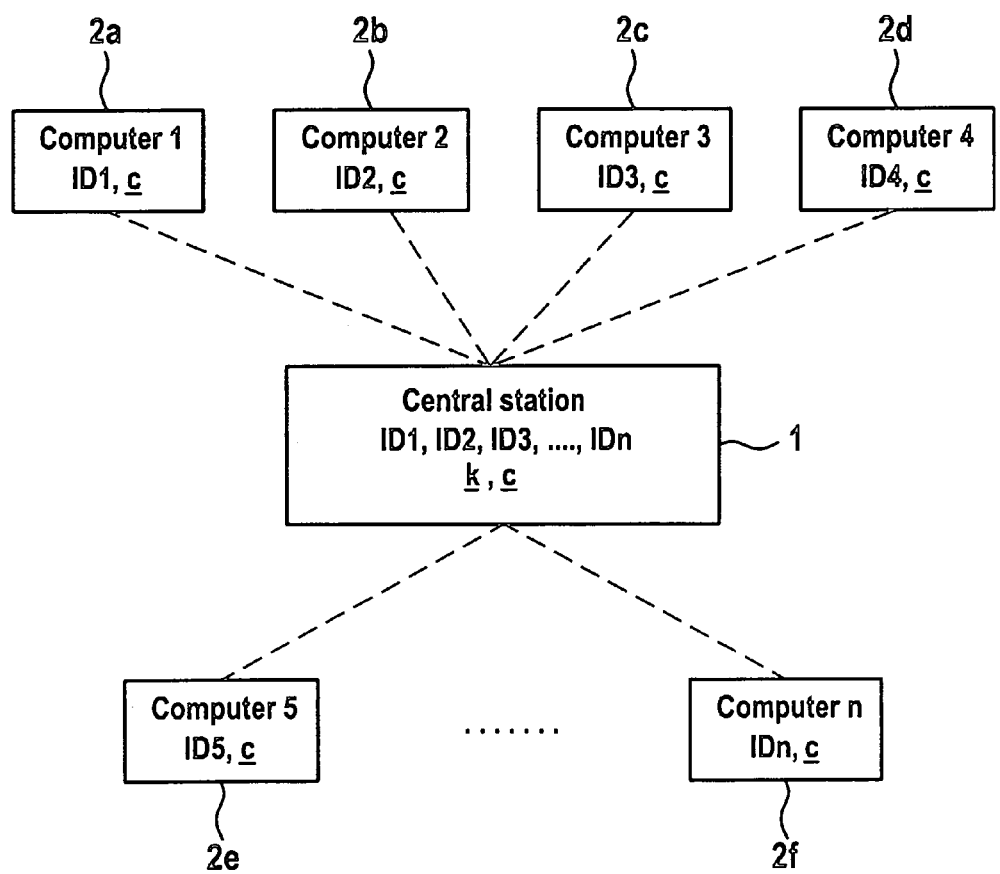
FIG. 1 illustrates a system overview.

FIG. 1 illustrates a system overview with a central station 1 and seven computers 2a to 2f of a total of n computers. The computers 2 are local computer systems of a wide variety of types. The computers 2 are connected to the central station 1, not via a fixed line network. However, the computers 2 can contact the central station 1 by means of a telephone connection or Internet connection. This is also not a prerequisite for carrying out the method, however.

The central station 1 stores the device identifiers ID1 to IDn and also the key k for decrypting the encrypted files and the change vector c for changing the device identifier ID with each enable procedure, in the form of vectors. Each of the local computers 2 stores the individual device identifier ID and also the change vector c. A software package is stored on a CD-ROM and contains a number of programs and databases in a hierarchical file structure. A file management program is also stored on the CD-ROM.

Figure 2:
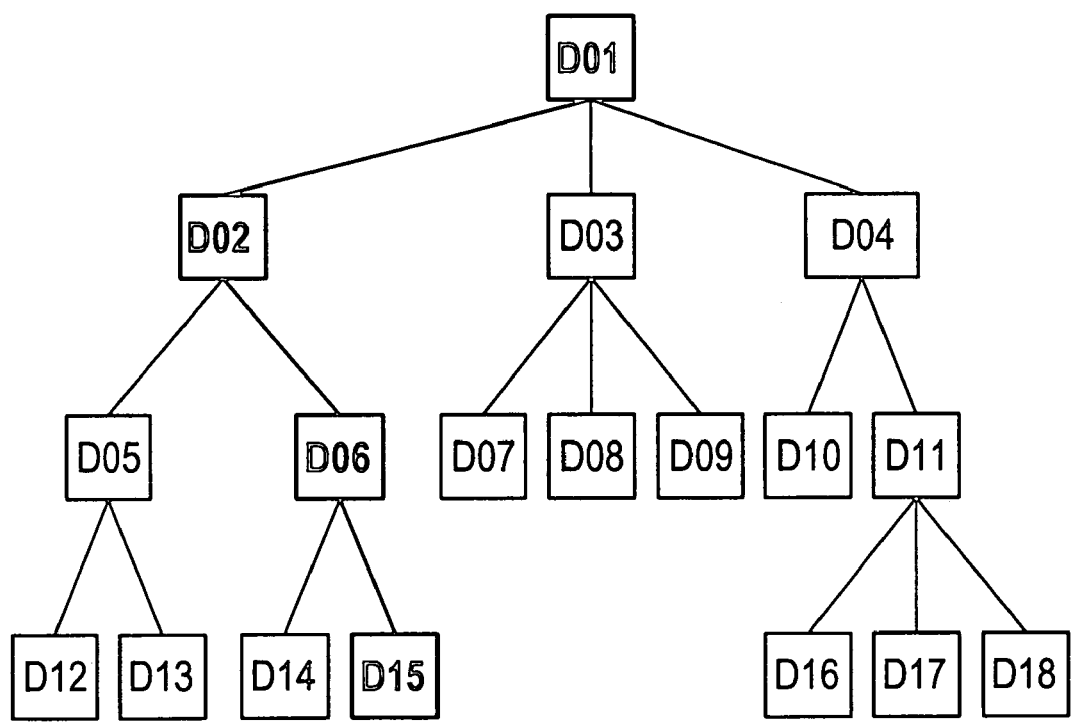
FIG. 2 illustrates the file structure for the files.

FIG. 2 shows such a file structure, where the files D01 to D18 may also be file directories and hence contain other files or file directories. In the case of a CD-ROM for a navigation system, the file D01 may be the file directory "Countries", for example. In this case, the files D02 to D04 may be regional file directories, in particular individual countries. These file directories can be split again, as is the case with the file directory D02, for example, which is split into the file directories D05 and D06. By way of example, D02 may be a country directory "Germany", and the file directories D05 and D06 may be the file directories for "Northern and Southern Germany". The respective file directories D05 and D06 then have associated files for the map data D12 and D14 and associated files D13 and D15 containing the associated travel guides.

D03 may be a file directory for another country, for example France, where this file directory now has the appropriate files D07 to D09 directly associated with it, and, by way of example, files for the map data, a travel guide and a hotel directory may be involved. Each of these files has an associated identifier which has 18 components and thus corresponds to the sum total of the files and file directories. In this case, the file directory D01 is characterized by the first component of the vector, the file directory D02 is characterized by the second component, and, generally, the file m is characterized by the component m of the vector.

The entire vector for identifying a file is thus made up of the path leading to this file. This is described using the example of the file D15, and is illustrated in the bottom area of FIG. 2. The path to the file D15 is routed via the files and file directories D01, D02, D06 and D15, so that the corresponding positions 01, 02, 06 and 15 in the associated vector for the file D15 take the value 1, while all other components of the vector take the value 0. To ensure that the identifier for a file provides adequate protection, it should not comprise too few components. To ensure adequate protection by the identifier even with a small number of files, said identifier can be extended, as shown in FIG. 3.

FIG. 3a shows an identifier containing 10 components, this being intended to correspond to the number of files. FIG. 3b shows an extension of this identifier to 19 components, with random components r being inserted between the components which characterize a file, said random components being eliminated again by the system.

The user of one of the computers 2 can now purchase a CD-ROM containing a number of files and does not first have to obtain any ultimate use rights. By way of example, the buyer of a new car gets a navigation system and a CD-ROM containing the associated databases at the same time as the car. However, since the user has under some circumstances not yet been registered as such in the central station, he can still not use his computer system to access the individual files stored in encrypted form on the CD-ROM. First, the user will load the file management system, which is likewise stored on the CD-ROM, into his computer system. The user must then obtain the use authorization from the central station. To do this, the user can make a telephone call to the central station. Alternatively, access may be had through a wireless Internet connection.

Figure 4:
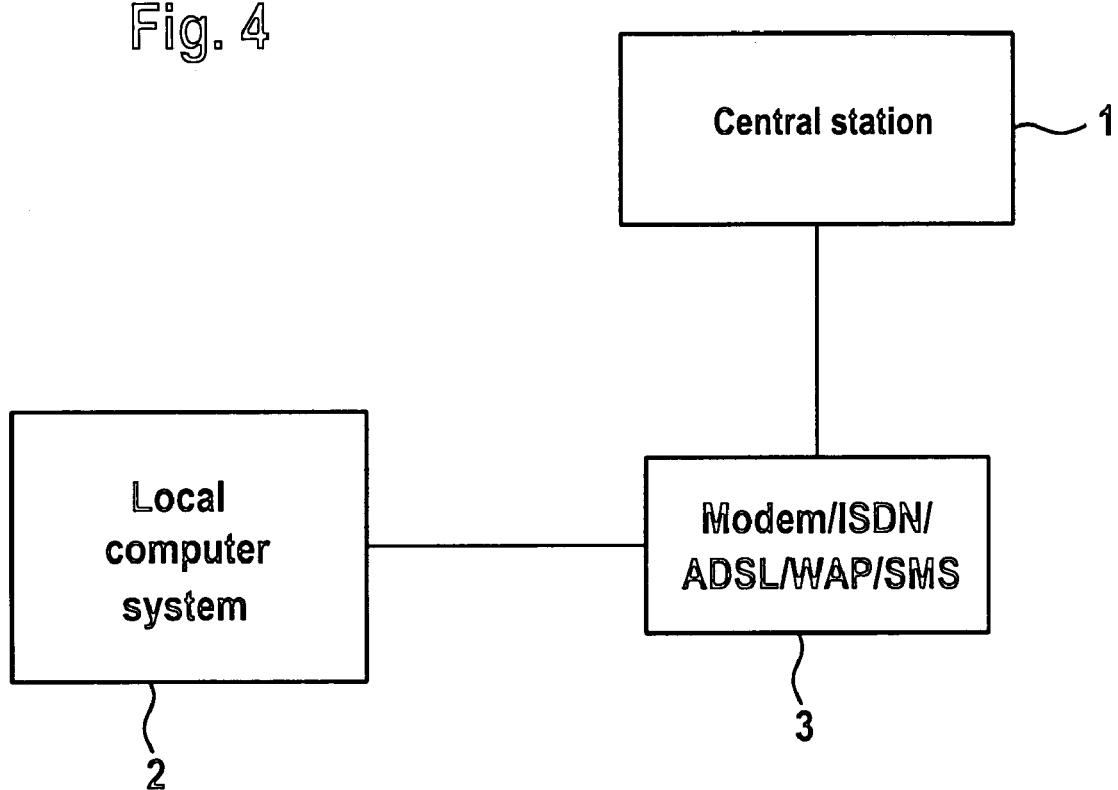
FIG. 4 illustrates a system overview for an automated enabling method.

An automated method which uses the components shown in FIG. 4 will be described below, however. In this case, besides the local computer 2 and central station 1, a switching medium 3 connected to both is involved. In this context, the central station 1 and the computer system 2 can be connected, for example, by means of a landline network telephone connection using a modem, an ISDN line or an ADSL line. In addition, a radio link to a mobile radio telephone and data transmission on the basis of the WAP standard may be involved, or the data transmission can take place via the mobile radio telephone in the form of an SMS message. Another example mentioned is data transmission over the Internet.

The inventive method itself is explained in more detail below with the aid of FIG. 5.

In step S1, the computer user first calls up a menu program which gives him a list of choices relating to the programs and databases stored on the CD-ROM. The user selects one or more of the desired programs and additionally enters the necessary information relating to the payment details, such as his credit card number (step S2). The user then activates the transmission request used to invoke the connection to the central station. In step S4, the connection to the central station is finally set up, for example via a mobile radio link in the case of a motor vehicle navigation system, or else via an Internet connection. Next, the enable request, the payment data and the present device identifier ID(i-1) are transmitted in step S5, said device identifier being stored in a nonvolatile memory of the computer and being automatically transmitted at the same time.

Once these data have been received, the central station first calculates a new device identifier ID(i) from the previous device identifier ID(i-1) and the change vector c, for example: ID(i)=ID(i-1)*c.

Next, a first scrambled code PIN is calculated, which contains the new device identifier ID(i) and the key k required for encrypting the files on the CD-ROM, for example on the basis of: PIN=inv[ID(i)]*k.

A second scrambled code ACW is then calculated, which contains the key k and also the identifier AC for the desired file which is to be enabled (step S6), for example on the basis of: ACW=k*AC.

In step S7, the new device identifier ID(i) and also information about the enabled file and the payment details are stored in the central station.

The scrambled codes PIN and ACW are then transmitted back to the local computer, and the connection is terminated. In the case of the automatic enabling outlined, the scrambled codes PIN and ACW can be transmitted directly in the form of vectors or binary numbers.

When enabling files by means of a telephone call or by post, it is advantageous if the vector, which contains binary components, is first written as a binary number and is converted into a decimal number, the decimal number then being conveyed to the user. In this case, the user can enter the simpler and shorter decimal number into his computer system, which then in turn converts it into a binary number or into a vector containing binary components.

Figure 5:
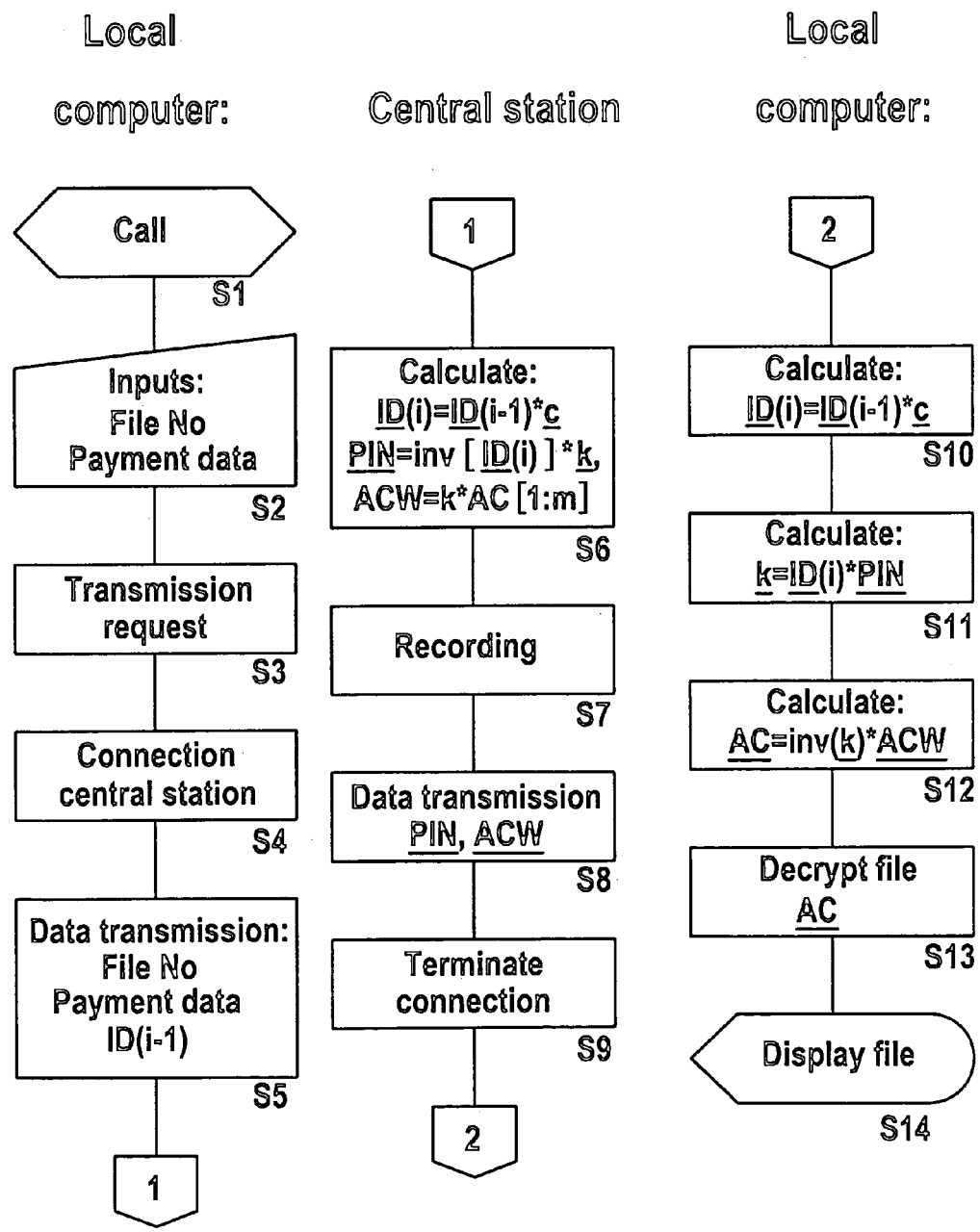
FIG. 5 illustrates a flowchart of the method.

The method taking place in the computer once the codes PIN and ACW have been transmitted or entered is likewise shown in FIG. 5 in steps S10 to S14. First, the computer system calculates the new device identifier ID(i) from the previous device identifier ID(i-1) stored in the device to date and the change vector c, which is likewise stored in the computer system, on the basis of: ID(i)=ID(i-1)*c.

The new device identifier ID(i) and the first scrambled code PIN can now be used to calculate the key k for decrypting the files. Next, the key k or the vector inv(k), which is the inverse of the key vector k, and the second scrambled code ACW are used to calculate the identifier AC for the file which is to be enabled, on the basis of: AC=inv(k)*ACW. For symmetrical encryption algorithms, inv(k) is =k.

The file management system then enables the file associated with the identifier AC for use, and this file can be decrypted using the key k which is now known, and can be displayed or used for further processing.

The method according to the invention thus always couples the enabling of a file to the device identifier, so that the enable codes cannot be used for another system. The change made to the device identifier whenever a use authorization is newly enabled means that protection is increased. The files on the data medium are also encrypted using the key k, and the key k can be produced from the first scrambled code PIN only if the device identifier is known. In turn, the identifier AC for the file which is to be enabled can be calculated from the second scrambled code only when the key k is known.

In addition, the method according to the invention can also be used to enable files temporarily. Such temporary enabling is useful, for example, for testing a piece of software for a few days, and only after the test deciding whether a full use right will be obtained. In such a case, the CD-ROM containing the files can be obtained for a low price, and the files can be enabled via the central station for a limited period of, by way of example, 3 days or one week. Temporary enabling is also useful for motor vehicle navigation systems, for example if a user requires map data for a particular regional area only for a limited period of time. By way of example, such an instance may be a foreign holiday in a country X for a few weeks.

A file can be temporarily enabled on this basis by virtue of the identifier for the file which is to be enabled containing components which characterize temporary enabling. An appropriate identifier is shown in FIG. 3c, for example. In this example, the first 10 components of the vector AC for the identifier are linked to the files stored on the CD-ROM, as in the cases described above. In addition, the vector now contains the components t1, t2 and t3, however, which give details of use with a time limit. By way of example, the component t1 can be used to enable the file for a period of one week if this component is set to 1. Accordingly, the component t2 can be used to enable the file for a period of one month if this component is set to 1. Accordingly, the component t3 can be used to prescribe that the file be enabled for a period of 6 months. In this context, the period starts to run only when the file is enabled. The computer system or the file management program of the computer system recognizes, in this case, whether one of the components t1 to t3 has been set to one, and sets a corresponding time marker, in which case, whenever new use of the file is planned, a check is carried out to determine whether the set time frame has expired.

We claim:

1. A method for enabling access to a file, which is stored on a storage medium together with at least one other file by a computer system comprising the steps of:
    transmitting a device identification number ID(i-1) for the computer system, to a central station;
    calculating a new device identification number ID(i) using the transmitted device identification number ID(i-1) and an alternating code c in the central station;
    generating a first scrambled code PIN using the calculated device identification number ID(i) and a key k in the central station;
    generating a second scrambled code ACW using an identifier for the file which is to be enabled and the key k in the central station,
    transmitting the first scrambled code PIN and the second scrambled code ACW from the central station to the computer system;
    calculating the new device identification number ID(i) in the computer system from the previously stored device identification number ID(i-1) and the alternating code c, which is stored in a nonvolatile memory of the computer system;
    calculating the key k using the first scrambled code PIN and the device identification number ID(i);
    calculating an identifier AC for the file using the second scrambled code ACW and the key k;
    enabling the file provided with the identifier AC for use by the computer system.

2. The method according to claim 1, characterized in that the files are encrypted using the key k and are decrypted for use by the computer system using the key k.

3. The method according to claim 1, characterized in that the files are stored on the storage medium in a logical file structure, in particular in a hierarchical file structure.

4. The method according to claim 1, characterized in that the identifier for a file can be described as a vector.

5. The method according to claim 4, characterized in that the vector has binary components.

6. The method according to claim 5, characterized in that the vector has at least m components, where m is the number of files.

7. The method according to claim 6, characterized in that m components a(1), a(2), a(3), . . . of the vector AC(x)=(a(1), a(2), a(3), . . . , a(x-1), a(x), a(x+1), a(m)) are used to determine the position of a file D(x) in the hierarchical file structure such that all the components of the vector AC(x) which are allocated to files on which the file D(x) is hierarchically dependent take a first value while all the remaining components, which are allocated to files on which the file D(x) is not hierarchically dependent, take a second value.

8. The method according to claim 1, characterized in that the key k can be described as a vector.

9. The method according to claim 1, characterized in that the computer system is a navigation computer in a motor vehicle navigation system.

10. The method according to claim 1, characterized in that the files contain road map data.

11. The method according to claim 1, characterized in that the files contain application programs.

12. The method according to claim 1, characterized in that one of the scrambled codes contains an information item relating to a time limit on a use right.

13. The method according to claim 1, characterized in that the second scrambled code can be described as a vector, and the vector contains one or more components storing the information item relating to the time limit on the period of use.

14. The method according to claim 13, characterized in that the vectors for the scrambled codes are converted into decimal numbers before transmission.

15. The method according to claim 1, characterized in that the file(s) is(are) transmitted to the computer system via a communication network.

16. A system for managing and enabling use rights on files, comprising:
    a plurality of local computer systems, where each of the computer systems can be identified by a device identification number ID;
    storage media for the local computer systems on which at least two files are stored and provided with an identifier AC;
    a central station having a central computer system in which the device identification numbers ID for the local computer systems are recorded, where the central station contains means for stipulating a first and a second scrambled code (PIN and ACW) for the purpose of enabling use rights on a file for one of the local computer systems, at least one of the codes containing the stored device identification number for the local computer system, and at least one of the codes containing the identifier AC for the file which is to be enabled;
    means for transmitting the scrambled codes to the local computer system;
    means for unscrambling the transmitted codes in the local computer system using the device identification number stored in the local computer system and for enabling the file for use by the local computer system.

17. A system according to claim 16, characterized in that the storage media are optical storage media, in particular CD-ROM or DVD.

18. A system according to claim 16, characterized in that the local computer systems are navigation computers in motor vehicle navigation systems.

19. A system according to claim 16, characterized in that the local computer system contains a file management system which enables use of only those files for which the identifier AC is present.

20. A system according to claim 16, characterized in that the first and the second scrambled code can be transmitted directly from the central station to the local computer system.

21. A system according to claim 20, characterized in that the transmission takes place wirelessly.

22. A system according to claim 20, characterized in that the local computer system is connected to a radio telephone.

23. A system according to claim 16, characterized in that the files are encrypted.

24. A system according to claim 16, further comprising means for transmitting the files from the central station to the local computer system.

25. A system according to claim 16, characterized in that the key k for decrypting the files is held in one of the scrambled codes.

26. A system according to claim 16, characterized in that usage rights are time-limited.

27. A system according to claim 16 further comprising: a portable low-density IC card, on which the first and the second code are stored.

* * * * *